Patented Dec. 4, 1945

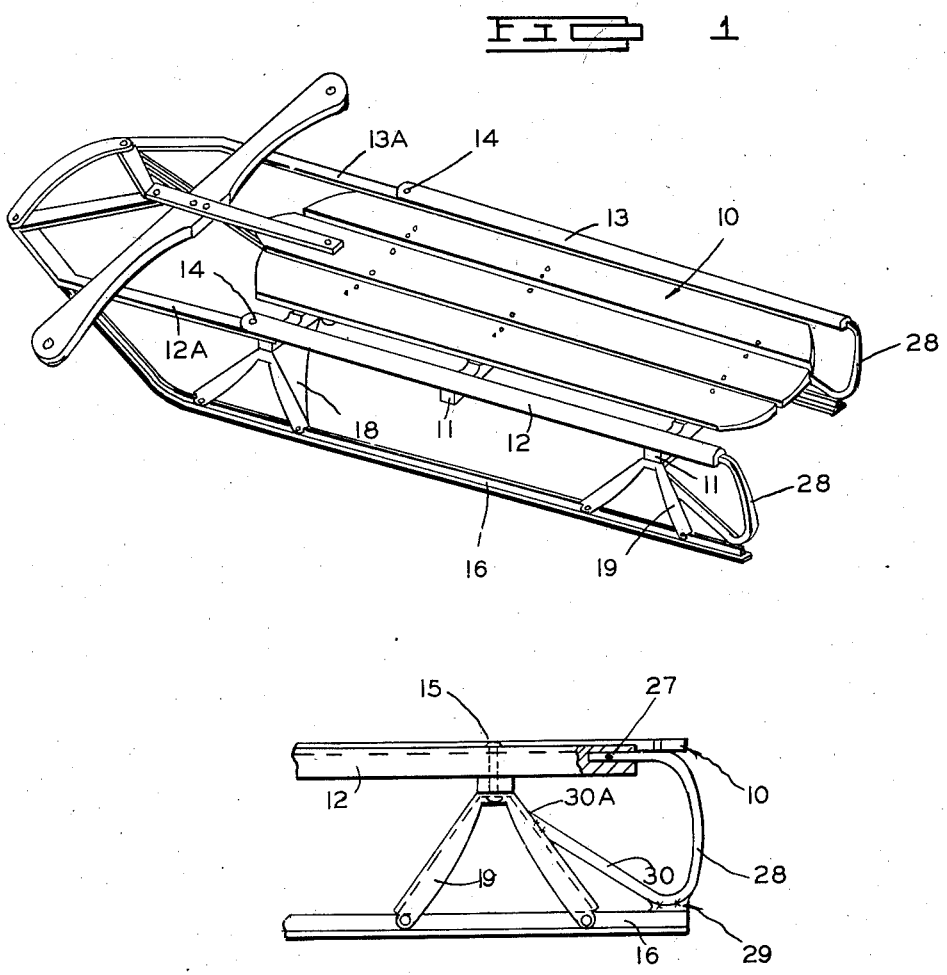

2,390,256

UNITED STATES PATENT OFFICE 2,390,256

COASTING SLED

Max A. Holbrook, Coldwater, Mich.

Application June 13, 1941, Serial No. 397,847

1 Claim. (Cl. 280—12)

The present invention relates to safety coasting sleds provided with means for guarding or eliminating the sharp ends of the runner.

It is one object of the invention to provide a safety sled in which the rearwardly extending end portions of the runners are covered or protected by guard means connecting said end portions to other parts of the sled; thereby preventing the painful cuts or injuries to children which have often occurred heretofore because of accidental bodily contact with the sharp, projecting, unprotected runner ends of conventional sleds.

Another object of the invention is to provide runner protecting means which may be incorporated in a sled structure having the usual wooden side rails.

It is a more specific object of the invention to provide runner protecting means of the foregoing general character which may be utilized with runners bent at their end portions; and to provide protecting means which may be utilized to guard the sharp ends of conventional straight ended runners. Furthermore, my runner protecting means may be incorporated in a conventional sled structure without requiring material alterations to that structure; and without requiring parts of the sled to be especially constructed for use with said means. Consequently, my runner protecting means may be readily incorporated in newly manufactured sleds or added to previously manufactured ones, thus being adapted for widespread use.

Still another object of the invention is to provide runner protecting means simple in construction but most effective in use; and which may be produced inexpensively, all of which makes said means still further adapted for widespread use and therefore adapted to provide practical protection for a maximum number of children.

Other objects of the present invention will appear in the following description and appended claim, reference being had to the accompanying drawing forming a part of this specification wherein like reference characters designate corresponding parts in the several views.

Fig. 1 is a view in perspective of a sled construction embodying one form of the present invention;

Fig. 2 is a side elevation partially in section of the rear portion of the sled structure shown in Fig. 1.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

One preferred embodiment of my invention is shown herein by way of example in Fig. 1. As there shown, the sled structure may include a platform or deck indicated generally at 10. This platform or deck may be of any suitable structure; for instance, it may comprise slats or boards, as shown in Fig. 1, attached to suitable transverse supports or bolsters 11 disposed between the deck at various points where required. Extending along each side of the sled construction is one of a pair of wooden side rails 12 and 13. Viewing the sled from back to front, the side rail 12 is disposed along the left side of the sled structure, and the side rail 13 is disposed along the right side thereof. These side rails are supported by the laterally extending ends of the bolsters 11; and are secured thereto by any suitable fastening elements, such as the rivets 14, 14 and 15, 15. These side rails 12 and 13 are provided with extending end portions projecting rearwardly of the rear bolster 11.

In view of the foregoing, it will be understood that the platform or deck 10, the bolsters 11, and the side rails 12 and 13 form a top member or portion of the sled structure to which the remaining parts of said structure are attached.

Among such remaining parts of the sled structure are the runners 16 and 17, which are connected to the aforesaid top portion, and are vertically spaced therefrom. These runners may be connected to the top portion by any suitable means, for example, supports or knees 18 and 19 may be attached to the runners and also to the lower side of the bolsters 11 in the manner indicated clearly in Fig. 1. In this connection, the rivets 14, 14 and 15, 15 utilized to connect the side rails 12 and 13 to the bolsters 11, may also connect the supports or knees 18 and 19 to said bolsters, as also shown in Fig. 1. However, separate fastening means may be utilized to connect the knees to the bolsters; and also to connect the bolsters to the side rails, if preferred. It will be observed that one of the pair of runners 16 and 17 is disposed in substantially the same vertical plane with one of the pair of side rails 12 and 13. Accordingly, throughout most of its length the left runner 16 underlies the left side rail 12, while the right runner 17 similarly underlies the right side rail 13. However, the rearwardly extending ends of the runners are connected to the rearwardly extending ends of the side rails in the manner explained hereinafter.

The runners 16 and 17 extend upwardly and forwardly at their front ends and are fixed to a suitable bumper bar in the manner indicated in Fig. 1. However, this particular structural feature does not pertain to the present invention and is therefore not described in detail. Furthermore, the steering mechanism as well as the metallic side bar members 12a and 13a, all of which are illustrated in Fig. 1, may be of any suitable construction so that a detailed description thereof is not necessary herein.

As shown in Fig. 1, the runners 16 and 17 are provided with rearwardly extending portions projecting beyond the rear knees 19.

As shown in Fig. 2, a metallic piece 28 is connected to the end of the side rail and is fastened to the upper part of the upwardly projecting ridge or flange of the runner 16 as by spot welding, as shown at 29. The metallic piece 28 possesses a generally forwardly and upwardly extending portion 30 which terminates against the rear leg of the knee 19 and is secured thereto by suitable means, such as another spot weld shown at 30a. It will be appreciated that this construction provides a protecton or guard means for the sharp extending runner ends and provides a strong construction due to the reinforcing function of the extending portion 30 and the fastening of the element 28 to the sled construction at the points shown at 29 and 30a.

In view of the foregoing, it will be appreciated that my invention provides a simple, inexpensive but effective guard means for the runner ends of sleds, which means may be utilized with a minimum of changes in conventional sled structures, and which may be utilized to protect straight-ended ends. Thus, my invention is adapted for widespread use on newly fabricated sleds or may be added to prefabricated sleds to protect children from the painful cuts or injuries heretofore too often sustained by them because of accidental bodily contact with the sharp projecting rear runner ends of conventional sleds.

I claim:

In a sled construction provided with a top member, with a pair of runners having rearwardly extending sharp ends, and with knees connecting said runners to said top member; a pair of wooden side rails forming a part of said top member and terminating in rearwardly projecting ends, each of said ends having a slot therein, means for protecting the user of the sled construction from bodily contacting the sharp ends of the runners, said means comprising a pair of metallic pieces, each piece having a generally upstanding part terminating in a bent end extending into and secured within the slot in one of said side rails, said piece also having a portion extending from the other end of said upstanding part in a generally upwardly and forwardly direction, said portion terminating against one of said knees and being secured thereto, said piece being secured to the extremity of said runner near the juncture of said upstanding part and said portion, whereby said pieces provide guard means for the sharp ends of said runners.

MAX A. HOLBROOK.